United States Patent
Narayanan et al.

(10) Patent No.: US 8,032,356 B2
(45) Date of Patent: Oct. 4, 2011

(54) SPOKEN TRANSLATION SYSTEM USING META INFORMATION STRINGS

(75) Inventors: Shrikanth Narayanan, Santa Monica, CA (US); Panayiotis Georgiou, La Crescenta, CA (US); Murtaza Bulut, Los Angeles, CA (US); Dagen Wang, Yorktown Heights, NY (US)

(73) Assignee: University of Southern California, Los Angeles, CA (US)

( * ) Notice: Subject to any disclaimer, the term of this patent is extended or adjusted under 35 U.S.C. 154(b) by 933 days.

(21) Appl. No.: 11/754,148

(22) Filed: May 25, 2007

(65) Prior Publication Data

US 2008/0065368 A1    Mar. 13, 2008

Related U.S. Application Data

(60) Provisional application No. 60/803,220, filed on May 25, 2006.

(51) Int. Cl.
*G06F 17/28* (2006.01)
*G06F 17/20* (2006.01)
*G06F 17/27* (2006.01)

(52) U.S. Cl. .................................. 704/2; 704/8; 704/9

(58) Field of Classification Search .................. None
See application file for complete search history.

(56) References Cited

U.S. PATENT DOCUMENTS

| | | | |
|---|---|---|---|
| 2,177,790 A | 10/1939 | Scott | |
| 2,674,923 A | 4/1954 | William | |
| 4,067,122 A | 1/1978 | Fernandez et al. | |
| 4,419,080 A | 12/1983 | Erwin | |
| 4,604,698 A | 8/1986 | Ikemoto et al. | |
| 4,658,374 A | 4/1987 | Tanimoto et al. | |
| 5,161,105 A | 11/1992 | Kugimiya et al. | |
| 5,201,042 A | 4/1993 | Weisner et al. | |
| 5,576,953 A | 11/1996 | Hugentobler | |
| 5,678,001 A | 10/1997 | Nagel et al. | |
| 5,697,789 A | 12/1997 | Sameth et al. | |
| 5,741,136 A | 4/1998 | Kirksey et al. | |
| 5,760,788 A | 6/1998 | Chainini et al. | |
| 5,799,267 A | 8/1998 | Siegel | |
| 5,855,000 A * | 12/1998 | Waibel et al. | 704/235 |
| 5,882,202 A | 3/1999 | Sameth et al. | |
| 5,991,594 A | 11/1999 | Froeber et al. | |
| 5,991,711 A | 11/1999 | Seno et al. | |
| 6,073,146 A | 6/2000 | Chen | |
| 6,243,675 B1 | 6/2001 | Ito | |
| 6,339,754 B1 | 1/2002 | Flanagan et al. | |
| 6,374,224 B1 * | 4/2002 | Horiguchi et al. | 704/266 |
| 6,394,899 B1 | 5/2002 | Walker | |
| 6,669,562 B1 | 12/2003 | Shiino | |
| 6,755,657 B1 | 6/2004 | Wasowicz | |
| 6,859,778 B1 * | 2/2005 | Bakis et al. | 704/277 |
| 6,866,510 B2 | 3/2005 | Polanyi et al. | |

(Continued)

OTHER PUBLICATIONS

U.S. Patent Office, U.S. Appl. No. 11/750,926, in Office Action dated Nov. 1, 2010, 26 pages.

(Continued)

*Primary Examiner* — Brian L Albertalli
(74) *Attorney, Agent, or Firm* — Fish & Richardson P.C.

(57) ABSTRACT

Spoken translation system which detects both speech from the information and also detects meta information streams from the information. A first aspect produces an enriched training corpus of information for use in the machine translation. A second aspect uses two different extraction techniques, and combines them by lattice rescoring.

15 Claims, 2 Drawing Sheets

U.S. PATENT DOCUMENTS

| | | |
|---|---|---|
| 6,970,821 B1 | 11/2005 | Shambaugh et al. |
| 7,016,829 B2 | 3/2006 | Brill et al. |
| 7,155,382 B2 | 12/2006 | Boys |
| 7,238,024 B2 | 7/2007 | Rehbein et al. |
| 7,409,348 B2 | 8/2008 | Wen et al. |
| 7,461,001 B2 * | 12/2008 | Liqin et al. .................... 704/277 |
| 7,689,407 B2 | 3/2010 | Yang et al. |
| 7,689,422 B2 * | 3/2010 | Eves et al. ..................... 704/270 |
| 2002/0059056 A1 | 5/2002 | Appleby |
| 2002/0095281 A1 | 7/2002 | Cox et al. |
| 2002/0184002 A1 | 12/2002 | Galli |
| 2004/0083111 A1 | 4/2004 | Rehbein et al. |
| 2004/0210923 A1 | 10/2004 | Hudgeons et al. |
| 2004/0248068 A1 | 12/2004 | Davidovich |
| 2005/0014563 A1 | 1/2005 | Barri |
| 2005/0084829 A1 | 4/2005 | Peters |
| 2005/0165645 A1 | 7/2005 | Kirwin |
| 2005/0216256 A1 | 9/2005 | Lueck |
| 2006/0212288 A1 | 9/2006 | Sethy et al. |
| 2006/0293874 A1 * | 12/2006 | Zhang et al. ...................... 704/2 |
| 2007/0015121 A1 | 1/2007 | Johnson et al. |
| 2007/0208569 A1 * | 9/2007 | Subramanian et al. ....... 704/270 |
| 2007/0294077 A1 | 12/2007 | Narayanan et al. |
| 2008/0003551 A1 | 1/2008 | Narayanan et al. |
| 2008/0040095 A1 | 2/2008 | Sinha et al. |
| 2008/0071518 A1 | 3/2008 | Narayanan et al. |
| 2008/0255824 A1 * | 10/2008 | Aso ..................................... 704/2 |
| 2008/0268955 A1 | 10/2008 | Spittle |
| 2009/0106016 A1 | 4/2009 | Athsani et al. |
| 2010/0009321 A1 | 1/2010 | Purushotma |

OTHER PUBLICATIONS

U.S. Patent Office, U.S. Appl. No. 11/749,677, filed May 16, 2007, in Office Action mailed Aug. 31, 2010, 20 pages.

U.S. Patent Office, U.S. Appl. No. 11/752,227, Filed May 22, 2007, in Office Action mailed Apr. 30, 2010, 10 pages.

U.S. Patent Office, U.S. Appl. No. 11/750,926, in Office Action dated Apr. 19, 2011, 15 pages.

* cited by examiner

SPOKEN TRANSLATION SYSTEM USING META INFORMATION STRINGS

CROSS-REFERENCE TO RELATED APPLICATIONS

This application claims priority to U.S. Provisional Application 60/803,220, filed May 25, 2006. The disclosure of the prior application is considered part of (and is incorporated by reference in) the disclosure of this application.

FEDERALLY SPONSORED RESEARCH OR DEVELOPMENT

The U.S. Government may have certain rights in this invention pursuant to Grant No. N66001-02-C-6023 awarded by DARPA/SPAWAR.

BACKGROUND

Speech translation systems are known in which a spoken utterance is converted to text using an automatic speech recognition or ASR system. This recognized speech is then translated using a machine translation "MT" system into the target language text. The target language text is subsequently re synthesized using a text to speech synthesizer.

SUMMARY

The present application defines determining additional information from speech beyond the conventional text information.

BRIEF DESCRIPTION OF THE DRAWINGS

These and other aspects will now be described in detail with reference to the accompanying drawings, wherein.

DETAILED DESCRIPTION

Figure 1:
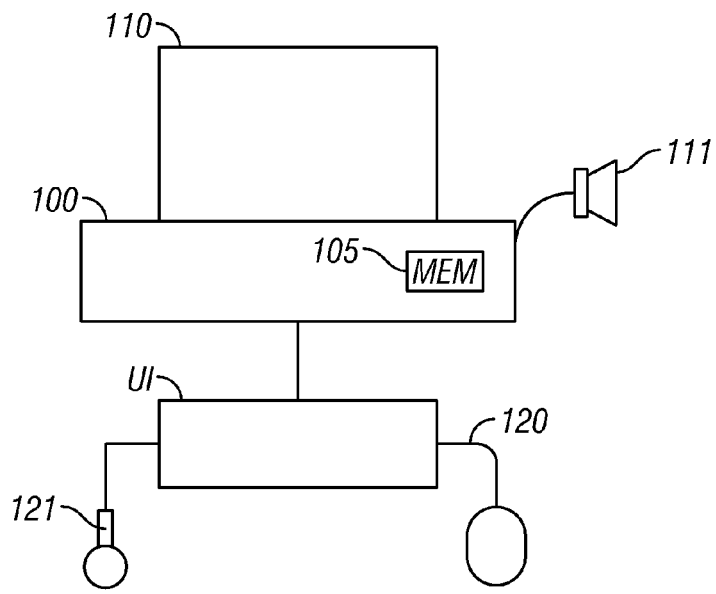
FIG. 1 illustrates a computer system that can be used

The operation can be carried out by a programmed computer that runs the flowcharts described herein. The computer can be as shown in FIG. 1 which illustrates an embodiment where a computer 100 runs a program that is stored on the storage media 105. The program produces output, e.g., on a display 110, or through an audio speaker 111, or by printing, or in some other way. The user can interact with the program and display via a user interface 120 which may include a keyboard and mouse, a microphone 121, and any other user interface part.

Figure 2:
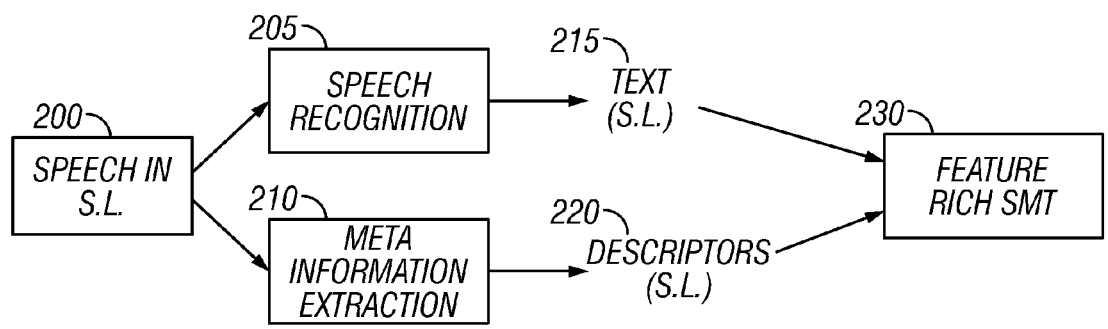
FIG. 2 illustrates flow steps of a first embodiment.

FIG. 2 illustrates a first embodiment which can be carried out as a routine that is executed by a processor that forms the computer. The FIG. 2 embodiment has an interface to a statistical machine translation system. Such systems are trained using training data, and the trained systems can translate information. In the embodiment, the system has been trained using enriched data that includes information indicative of non-text information. In the disclosed embodiment, the non-text information is the meta-information described herein. While this system may provide superior results, it requires a large amount of data to be produced.

Figure 3:
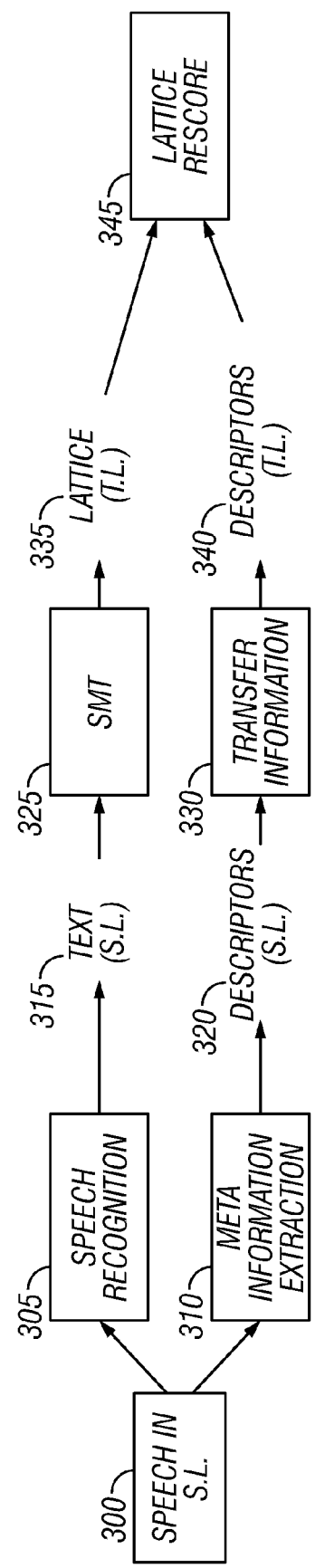
FIG. 3 illustrates flow steps of a second embodiment.

FIG. 3 shows a second embodiment which uses an independent text-to-text statistical machine translation training part, and also a second layer of analysis that is used at run time. The second layer analysis is called a transform augmented information. The system also uses a synthesis to re-score the lattice output of the statistical machine translation.

Additional information extracted by the speech channel can be used to produce additional information from the translation process. The additional information can include keywords, prominence information, emotional information, and class descriptors, as well as other prosodic information which is often ignored in a speech to text conversion and in the ensuing text-to-text conversion.

In FIG. 2, speech in the source language 200 is processed by recognizing the speech at 205, and also by extracting "meta information". The meta information in the embodiments may include the key words, as well as prominence, emotional and class descriptors as described above. For example, meta information can be found from words or oral characteristics that indicate superlatives or emphasis. Example words might include "unbelievably", or "very, very". Emphasis can also be signaled by oral emphasis on certain phrases. For example a keyword that indicate superlatives may have an accompanying indication of emphasis added as the meta information extracted by 210, e.g., an indication of bold or italics in written text, or an oral indication of emphasis in synthesized spoken text. The meta information extracts descriptors 220 that indicate the emphasis. These descriptors are associated with the text that is recognized from the speech.

Similarly, prominence information can indicate emphasis or the like by its words, or by emphasis in the sentence that indicates some kind of emphasized statement.

Emotional words may include words that indicate the user's state of mind, such as profanities, words like "upset", and other keywords that can be used to train the system. The emotions may also be determined from the cadence of the speech that is being recognized. For example a filter may be trained to recognize emotional type talking such as whining, crying, or screaming.

These and other words that recognize descriptors of information in the text become descriptors 200. These accompany the text, and form a feature rich statistical machine translation result 230, which may be, for example, a training corpus.

The meta information is preferably extracted from real audio, and not from the transcripts. This allows the emotion, the emphasis, and other information to be obtained. This training and subsequent translation may be expensive way in terms of computer resources.

FIG. 3 illustrates a separate statistical machine training and information training. At run time, a lattice rescoring operation merges two separate information channels. The training in FIG. 3 takes the speech in the source language, and carries out speech recognition at 305 to produce text in the source language 315, as in the FIG. 2 embodiment. It also determines the meta information at 310 to determine the descriptors 320. The result is two separate operations: a statistical machine translation which is carried out at 325, and a transfer of the descriptors at 330.

This produces a lattice of translated information in the target language at 335, which are presented along with the descriptors at 340. 345 illustrates using a lattice rescoring operation to merge the two information channels.

The above describes training and translating, however it should be understood that this system can be applied to either or both of training and/or translating the using the meta information.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specifica tion. The specification describes specific examples to accomplish a more general goal that may be accomplished in another way. This disclosure is intended to be exemplary, and the claims are intended to cover any modification or alternative which might be predictable to a person having ordinary skill in the art. For example, this can be used for speech recognition and/or speech translation, or training of such a system, or for any subset or superset thereof.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A system, comprising:
   a speech receiving part, receiving a segment of speech signal in a source language to be processed;
   a computer part, operating to process the segment of speech signal comprising:
      processing in a first information channel the segment of speech signal in the source language using a statistical machine translation training, comprising:
         recognizing speech in the processed segment of speech signal in the source language,
         converting the recognized speech into text in the source language, and
         converting the text in the source language into a lattice in a target language;
      processing in a second information channel the segment of speech signal in the source language using an information transfer training, the second information channel independent and separate from the first information channel, the processing in the second information channel comprising:
         extracting, from the segment of speech signal, meta information associated with the recognized speech, wherein the meta information includes at least one non-textual aspect of the recognized speech,
         obtaining descriptors in the source language from the meta information that includes at least one non-textual aspect, and
         transforming the obtained descriptors in the source language into descriptors in the target language; and
   an output part producing an output in the target language comprising combining the lattice in the target language and the obtained descriptors in the second language using lattice rescoring.

2. A system as in claim 1, wherein said computer part includes a training database, used to process said segment of speech.

3. A system as in claim 2, wherein said training database comprises a first training part for said text to text statistical machine translation training, and a second training part that includes information about said non-textual aspect.

4. A system as in claim 1, wherein said non-textual aspect includes keywords.

5. A system as in claim 1, wherein said non-textual aspect includes prominence information.

6. A system as in claim 1, wherein said non-textual aspect includes words which indicate emotions in the spoken speech.

7. A system as in claim 1, wherein said output part is an audio producing element.

8. A system as in claim 1, wherein said output part is a part that shows text.

9. A computer-implemented method, comprising:
   processing in a first information channel, at a computer comprising a processor, a segment of speech signal in a source language using a statistical machine translation training, the processing in the first information channel comprising:
      recognizing speech in the processed segment of speech signal in the source language,
      converting the recognized speech into text in the source language, and
      converting the text in the source language into a lattice in a target language;
   processing, at the computer, the segment of speech signal in the source language using an information transfer training in a second information channel independent and separate from the first information channel, the processing in the second information channel comprising:
      extracting, from the segment of speech signal, meta information associated with the recognized speech, wherein the meta information includes at least one non-textual aspect of the recognized speech,
      obtaining descriptors in the source language from the meta information that includes at least one non-textual aspect, and
      transforming the obtained descriptors in the source language into descriptors in the target language; and
   generating an output in the target language comprising combining the lattice in the target language and the descriptors in the target language using a lattice rescoring system.

10. A computer-implemented method of claim 9, wherein the meta information is extracted from an input consisting of the segment of speech signal.

11. A computer-implemented method of claim 9, wherein the text in the source language is retained in the first information channel.

12. A computer-implemented method as in claim 9, wherein said non-textual aspect includes keywords.

13. A computer-implemented method as in claim 9, wherein said non-textual aspect includes prominence information.

14. A computer-implemented method as in claim 9, wherein said non-textual aspect includes words which indicate emotions in the spoken speech.

15. A computer-implemented method as in claim 9, wherein said processing is carried out directly on received audio indicative of the speech.

* * * * *